US011093355B2

(12) United States Patent
Dunn et al.

(10) Patent No.: US 11,093,355 B2
(45) Date of Patent: *Aug. 17, 2021

(54) SYSTEM AND METHOD FOR DETECTION OF DISPLAY ERRORS

(71) Applicant: Manufacturing Resources International, Inc., Alpharetta, GA (US)

(72) Inventors: William Dunn, Alpharetta, GA (US); David Williams, Canton, GA (US); John Schuch, Buford, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/401,714

(22) Filed: May 2, 2019

(65) Prior Publication Data

US 2019/0258552 A1    Aug. 22, 2019

Related U.S. Application Data

(63) Continuation of application No. 15/262,837, filed on Sep. 12, 2016, now Pat. No. 10,353,785.

(Continued)

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/0757* (2013.01); *G06F 11/2025* (2013.01);
(Continued)

(58) Field of Classification Search
CPC .............. G06F 11/2028; G06F 11/203; G06F 11/2048; G06F 11/2023; G06F 11/2033;
(Continued)

(56) References Cited

U.S. PATENT DOCUMENTS 5,162,785 A    11/1992  Fagard
5,351,201 A    9/1994   Harshbarger, Jr. et al.
(Continued)

FOREIGN PATENT DOCUMENTS

CN    203277867 U    11/2013
EP    0313331 B1     2/1994
(Continued)

OTHER PUBLICATIONS

Photo Research, PR-650 SpectraScan Colorimeter, 1999, 2 Pages.
(Continued)

*Primary Examiner* — Amine Riad
(74) *Attorney, Agent, or Firm* — Standley Law Group LLP; Jeffrey S. Standley; Adam J. Smith

(57) ABSTRACT

A system and method for addressing failures in electronic display assemblies is provided. Each of a plurality of electronic display assembles include an electronic display, one or more components for operating the electronic display assembly, and a control device. A network operations center is located remote from, but in electronic communication with, each of the electronic display assembles. If the control devices determine that any of the components are not operating properly, the control device is configured to remove the power supplied to the components, wait a predetermined amount of time, and resume applying power.

20 Claims, 10 Drawing Sheets

Related U.S. Application Data

(60) Provisional application No. 62/216,470, filed on Sep. 10, 2015.

(51) Int. Cl.
*G06F 11/07* (2006.01)
*G06F 11/30* (2006.01)
*G06F 11/34* (2006.01)

(52) U.S. Cl.
CPC ...... *G06F 11/2028* (2013.01); *G06F 11/3041* (2013.01); *G06F 11/3476* (2013.01); *G06F 2201/805* (2013.01)

(58) Field of Classification Search
CPC .............. G06F 11/2025; G06F 11/2041; G06F 11/2097; G06F 2201/815; G06F 11/2007; G06F 2201/805; G06F 2201/84; G06F 11/1484; G06F 11/2038; G06F 2201/85; G06F 11/1658; G06F 11/2046; G06F 11/2035; G06F 11/2094; G06F 2201/80; G06F 11/1464; G06F 2201/82; G06F 11/0709

See application file for complete search history.

(56) References Cited

U.S. PATENT DOCUMENTS

| | | | |
|---|---|---|---|
| 5,590,831 A | 1/1997 | Manson et al. | |
| 5,751,346 A | 5/1998 | Dozier et al. | |
| 5,786,801 A | 7/1998 | Ichise | |
| 5,952,992 A | 9/1999 | Helms | |
| 6,144,359 A | 11/2000 | Grave | |
| 6,157,143 A | 12/2000 | Bigio et al. | |
| 6,215,411 B1 | 4/2001 | Gothard | |
| 6,222,841 B1 | 4/2001 | Taniguchi | |
| 6,259,492 B1 | 7/2001 | Imoto et al. | |
| 6,384,736 B1 | 5/2002 | Gothard | |
| 6,421,694 B1 | 7/2002 | Nawaz et al. | |
| 6,509,911 B1 | 1/2003 | Shimotono | |
| 6,546,294 B1 | 4/2003 | Kelsey et al. | |
| 6,553,336 B1 | 4/2003 | Johnson et al. | |
| 6,556,258 B1 | 4/2003 | Yoshida et al. | |
| 6,587,525 B2 | 7/2003 | Jeong et al. | |
| 6,753,842 B1 | 6/2004 | Williams et al. | |
| 6,771,795 B1 | 8/2004 | Isnardi | |
| 6,812,851 B1 | 11/2004 | Dukach et al. | |
| 6,850,209 B2 | 2/2005 | Mankins et al. | |
| 6,968,375 B1 | 11/2005 | Brown | |
| 7,038,186 B2 | 5/2006 | De Brabander et al. | |
| 7,064,672 B2 | 6/2006 | Gothard | |
| 7,319,862 B1 | 1/2008 | Lincoln et al. | |
| 7,330,002 B2 | 2/2008 | Joung | |
| 7,369,058 B2 | 5/2008 | Gothard | |
| 7,380,265 B2 | 5/2008 | Jensen et al. | |
| 7,391,317 B2 | 6/2008 | Abraham et al. | |
| 7,451,332 B2 | 11/2008 | Culbert et al. | |
| 7,474,294 B2 | 1/2009 | Leo et al. | |
| 7,577,458 B2 | 8/2009 | Lin | |
| 7,581,094 B1 | 8/2009 | Apostolopoulos et al. | |
| 7,595,785 B2 | 9/2009 | Jang | |
| 7,612,278 B2 | 11/2009 | Sitrick et al. | |
| 7,614,065 B2 | 11/2009 | Weissmueller, Jr. et al. | |
| 7,636,927 B2 | 12/2009 | Zigmond et al. | |
| 7,675,862 B2 | 3/2010 | Pham et al. | |
| 7,751,813 B2 | 7/2010 | Varanda | |
| 7,764,280 B2 | 7/2010 | Shiina | |
| 7,774,633 B1 | 8/2010 | Harrenstien et al. | |
| 7,795,821 B2 | 9/2010 | Jun | |
| 7,949,893 B1 * | 5/2011 | Knaus ................ | G06F 11/2092 714/4.11 |
| 8,212,921 B2 | 7/2012 | Yun | |
| 8,218,812 B2 | 7/2012 | Sugimoto et al. | |
| 8,248,203 B2 | 8/2012 | Hanwright et al. | |
| 8,441,574 B2 | 5/2013 | Dunn et al. | |
| 8,601,252 B2 * | 12/2013 | Mendelow .......... | G06F 11/1441 713/2 |
| 8,689,343 B2 | 4/2014 | De Laet | |
| 8,983,385 B2 | 3/2015 | Macholz | |
| 9,026,686 B2 | 5/2015 | Dunn et al. | |
| 9,812,047 B2 | 11/2017 | Schuch et al. | |
| 2002/0019933 A1 | 2/2002 | Friedman et al. | |
| 2002/0026354 A1 | 2/2002 | Shoji et al. | |
| 2002/0112026 A1 | 8/2002 | Fridman et al. | |
| 2002/0120721 A1 | 8/2002 | Eilers et al. | |
| 2002/0147648 A1 | 10/2002 | Fadden et al. | |
| 2002/0152425 A1 | 10/2002 | Chaiken et al. | |
| 2002/0163513 A1 | 11/2002 | Tsuji | |
| 2002/0163916 A1 | 11/2002 | Oskouy et al. | |
| 2002/0164962 A1 | 11/2002 | Mankins et al. | |
| 2002/0190972 A1 | 12/2002 | Ven de Van | |
| 2002/0194365 A1 | 12/2002 | Jammes | |
| 2002/0194609 A1 | 12/2002 | Tran | |
| 2003/0031128 A1 | 2/2003 | Kim et al. | |
| 2003/0039312 A1 | 2/2003 | Horowitz et al. | |
| 2003/0061316 A1 | 3/2003 | Blair et al. | |
| 2003/0097497 A1 | 5/2003 | Esakov | |
| 2003/0098881 A1 | 5/2003 | Nolte et al. | |
| 2003/0115591 A1 | 6/2003 | Weissmueller, Jr. et al. | |
| 2003/0117714 A1 | 6/2003 | Nakamura et al. | |
| 2003/0161354 A1 | 8/2003 | Bader et al. | |
| 2003/0177269 A1 | 9/2003 | Robinson et al. | |
| 2003/0192060 A1 | 10/2003 | Levy | |
| 2003/0196208 A1 | 10/2003 | Jacobson | |
| 2003/0214242 A1 | 11/2003 | Berg-johansen | |
| 2003/0230991 A1 | 12/2003 | Muthu et al. | |
| 2004/0036697 A1 | 2/2004 | Kim et al. | |
| 2004/0138840 A1 | 7/2004 | Wolfe | |
| 2004/0158872 A1 | 8/2004 | Kobayashi | |
| 2004/0194131 A1 | 9/2004 | Ellis et al. | |
| 2004/0243940 A1 | 12/2004 | Lee et al. | |
| 2004/0252400 A1 | 12/2004 | Blank et al. | |
| 2004/0253947 A1 | 12/2004 | Phillips et al. | |
| 2005/0033840 A1 | 2/2005 | Nisani et al. | |
| 2005/0070335 A1 | 3/2005 | Jitsuishi et al. | |
| 2005/0071252 A1 | 3/2005 | Henning et al. | |
| 2005/0073518 A1 | 4/2005 | Bontempi | |
| 2005/0088984 A1 | 4/2005 | Chin et al. | |
| 2005/0123001 A1 | 6/2005 | Craven et al. | |
| 2005/0132036 A1 | 6/2005 | Jang et al. | |
| 2005/0179554 A1 | 8/2005 | Lu | |
| 2005/0184983 A1 | 8/2005 | Brabander et al. | |
| 2005/0216939 A1 | 9/2005 | Corbin | |
| 2005/0231457 A1 | 10/2005 | Yamamoto et al. | |
| 2005/0267943 A1 | 12/2005 | Castaldi et al. | |
| 2005/0289061 A1 | 12/2005 | Kulakowski et al. | |
| 2005/0289588 A1 | 12/2005 | Kinnear | |
| 2006/0007107 A1 | 1/2006 | Ferguson | |
| 2006/0022616 A1 | 2/2006 | Furukawa et al. | |
| 2006/0150222 A1 | 7/2006 | McCafferty et al. | |
| 2006/0160614 A1 | 7/2006 | Walker et al. | |
| 2006/0269216 A1 | 11/2006 | Wiemeyer et al. | |
| 2007/0039028 A1 | 2/2007 | Bar | |
| 2007/0154060 A1 | 7/2007 | Sun | |
| 2007/0157260 A1 | 7/2007 | Walker | |
| 2007/0168539 A1 | 7/2007 | Day | |
| 2007/0200513 A1 | 8/2007 | Ha et al. | |
| 2007/0214812 A1 | 9/2007 | Wagner et al. | |
| 2007/0237636 A1 | 10/2007 | Hsu | |
| 2007/0268241 A1 | 11/2007 | Nitta et al. | |
| 2007/0273519 A1 | 11/2007 | Ichikawa et al. | |
| 2007/0274400 A1 | 11/2007 | Murai et al. | |
| 2007/0286107 A1 | 12/2007 | Singh et al. | |
| 2007/0291198 A1 | 12/2007 | Shen | |
| 2008/0008471 A1 | 1/2008 | Dress | |
| 2008/0019147 A1 | 1/2008 | Erchak et al. | |
| 2008/0024268 A1 | 1/2008 | Wong et al. | |
| 2008/0034205 A1 | 2/2008 | Alain et al. | |
| 2008/0037466 A1 | 2/2008 | Ngo et al. | |
| 2008/0037783 A1 | 2/2008 | Kim et al. | |
| 2008/0055297 A1 | 3/2008 | Park | |
| 2008/0096559 A1 | 4/2008 | Phillips et al. | |
| 2008/0104631 A1 | 5/2008 | Krock et al. | |

(56) References Cited

U.S. PATENT DOCUMENTS

| | | |
|---|---|---|
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Ianni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1 | 11/2011 | Schuch et al. |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1* | 12/2012 | Chung .................. H04N 5/77 386/200 |
| 2013/0162908 A1 | 6/2013 | Son et al. |
| 2014/0002747 A1 | 1/2014 | Macholz |
| 2015/0250021 A1 | 9/2015 | Stice et al. |
| 2016/0034240 A1 | 2/2016 | Kreiner et al. |
| 2017/0075777 A1 | 3/2017 | Dunn et al. |
| 2017/0163519 A1 | 6/2017 | Bowers et al. |
| 2017/0315886 A1* | 11/2017 | Helmick ............. G06F 11/2028 |
| 2018/0027635 A1* | 1/2018 | Roquemore, III ......................... H04W 52/0229 315/307 |
| 2018/0061297 A1 | 3/2018 | Schuch et al. |

FOREIGN PATENT DOCUMENTS

| | | |
|---|---|---|
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| JP | 2018537876 A | 12/2018 |
| KR | 10-2010-0081354 A | 7/2010 |
| KR | 10-2011-0065338 A | 6/2011 |
| WO | WO9608892 A1 | 3/1996 |
| WO | WO2008050402 A1 | 5/2008 |
| WO | WO2011106683 | 9/2011 |
| WO | WO2012/127971 A1 | 9/2012 |
| WO | WO2017044952 A1 | 3/2017 |

OTHER PUBLICATIONS

Texas Advanced Optoelectronic Solutions, TCS230 Programmable Color Light-To-Frequency Converter, 2007, 12 Pages.

Don Methven, Wireless Video Streaming: An Overview, Nov. 16, 2002, 7 Pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

\* cited by examiner

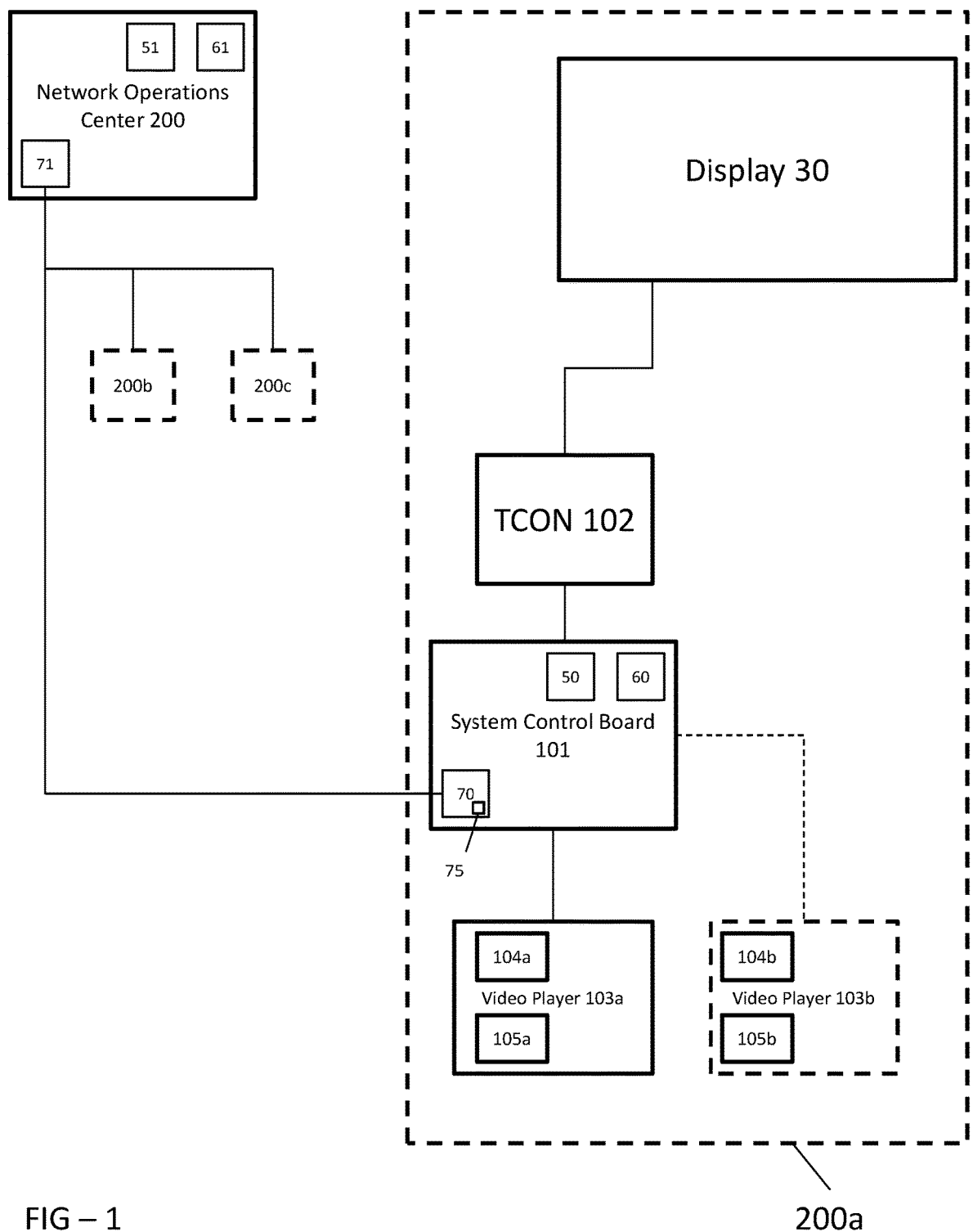
FIG − 1

SYSTEM AND METHOD FOR DETECTION OF DISPLAY ERRORS

CROSS-REFERENCE TO RELATED APPLICATIONS

This application is a continuation of U.S. application Ser. No. 15/262,837 filed Sep. 12, 2016, which claims the benefit of U.S. Provisional Application No. 62/216,470, filed Sep. 10, 2015, the disclosures of each of which are hereby incorporated by reference as if fully restated.

TECHNICAL FIELD

Embodiments generally relate to electronic displays typically used for advertising, information, and point of sale applications.

BACKGROUND OF THE ART

Electronic displays are now being used in indoor, outdoor, and semi-outdoor environments for advertising, information, as well as point of sale applications. Generally speaking, once installed, it is desirable to ensure operation throughout the life of the device. Downtime can be costly in that advertising revenue and opportunities can be lost, information will not be effectively transmitted to the public, and customers cannot view the purchase options in a point of sale application.

SUMMARY OF THE EXEMPLARY EMBODIMENTS

The exemplary embodiments herein provide a system and method for monitoring one or more remote electronic displays for possible failures, and providing system logic so that failures can be addressed immediately by the system, without requiring any user intervention. The system can monitor a number of system attributes such as heartbeat signals, status messages, LED light signals, video/image frame data, and network communications, while making near instantaneous changes in operation of the device in order to reduce or eliminate downtime of the displays.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 1 is a simplified bock diagram of an exemplary embodiment of the overall system architecture.

DETAILED DESCRIPTION

Figure 1A:
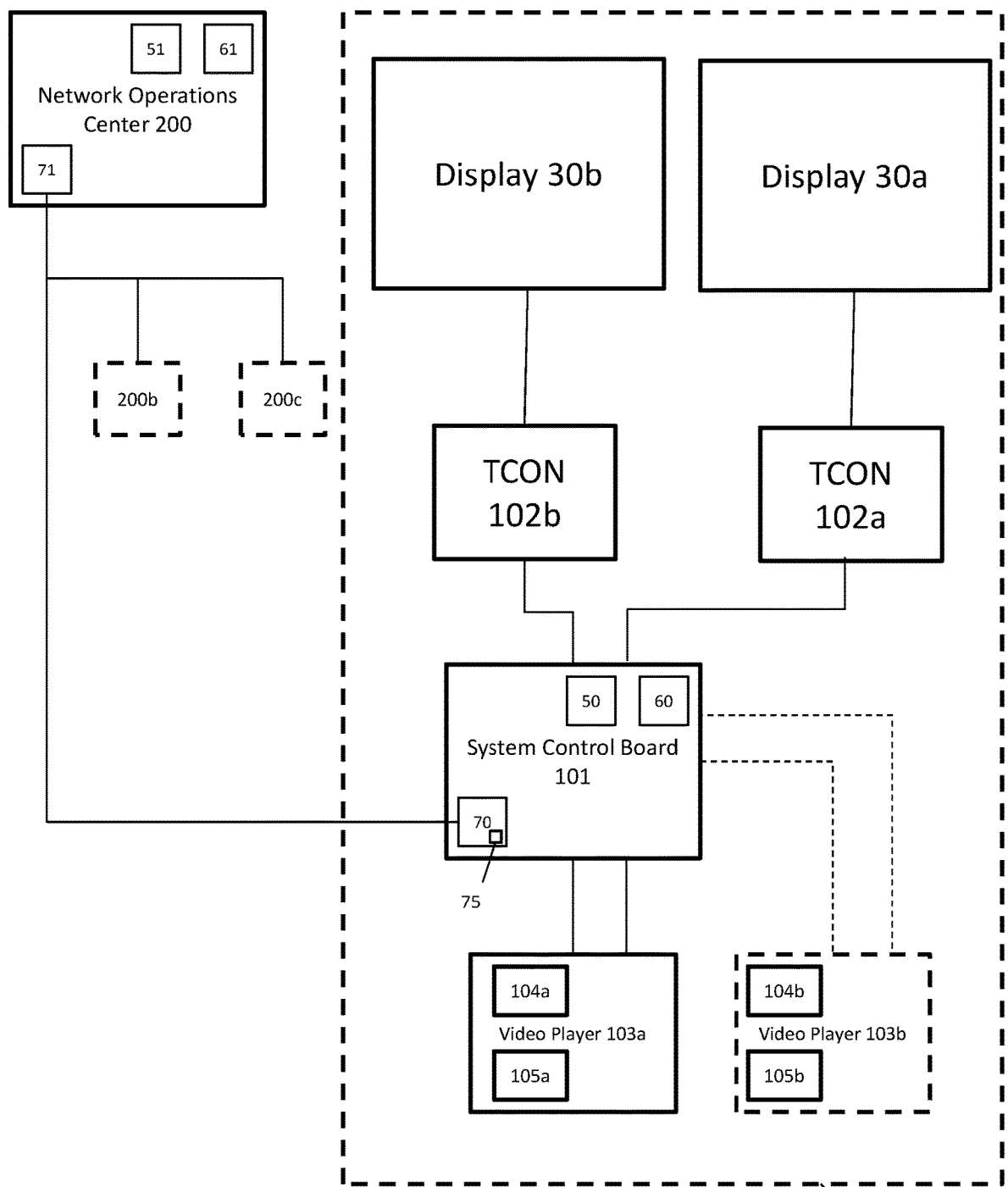
FIG. 1A is a simplified block diagram of another exemplary embodiment of the overall system architecture.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Initially it should be noted that one of ordinary skill in the art understands that electronic displays as described herein are capable of displaying both still images as well as videos. Thus, it should be recognized that the terms 'image' and 'video' may be used interchangeably herein. Further, one having an ordinary level of skill in the arts will also understand that the electrical connections described herein may be wired or wireless.

FIG. 1 is a simplified bock diagram of an exemplary embodiment of the overall system architecture. A system control board 101 preferably contains at least a processor 50, electronic storage 60, and a network interface component 70 (which preferably includes a power button 75). In exemplary embodiments of the present invention, the power button 75 is electrically connected to the system control board 101 such that the system control board 101 may simulate the user physically pressing the power button 75 as will be explained in greater detail herein. For example, but without limitation, the network interface component 70 may be electrically connected to the power button 75 via the power control header on the system control board 101. Similarly, the system control board 101 may be electrically connected to a power supply for the display assembly 200a such that the system control board 101 may simulate the user physically removing the power supply (i.e., unplugging) and reattaching the power supply (i.e., plugging back in).

A timing and control board (TCON) 102 is preferably in electrical connection with the system control board 101 as well as the electronic display 30. A primary video player 103a is also preferably in electrical connection with the system control board 101. An optional secondary video player 103b may also be in electrical connection with the system control board 101. Each video player preferably includes a power button 104 and a power LED 105 (labeled 104a, 105a, 104b, and 105b, respectively). Similar to the power button 75, the network interface component 70 may be electrically connected to the power button 104 and the power LED 105 as well as the power supply source to the video players 103a and 103b by way of the system control board 101 such that the system may simulate physically pressing the power button 104 as well as physically removing the power supply to the video players 103 and reattaching it.

A network operations center device 200 preferably contains at least a processor 51, electronic storage 61, and a network interface component 71 which communicates with the network interface component 70 on the display assembly 200a. Two other display assemblies 200b and 200c are shown in electrical connection with the network operations center device 200, and each would preferably have the same components as shown and described for the display assembly 200a, but this is not required. In some embodiments however, there could be even more than three display assemblies in electrical connection with the network operations center device.

FIG. 1A is a simplified block diagram of another exemplary embodiment of the overall system architecture. In this embodiment the display assembly 200d may be similar to that show in FIG. 1, but be comprised of a first display 30a and a second display 30b. The first display 30a may be in electrical connection with a first TCON 102a and the second display 30b may be in electrical connection with a second TCON 102b. The first and second TCONs 102a and 102b, respectively, may be in electrical communication with the system control board 101. The video players 103a and 103b may each comprise two electrical connections with the system control board 101 such that each video player 103a and 103b may control both the first and the second displays 30a and 30b.

Figure 2:
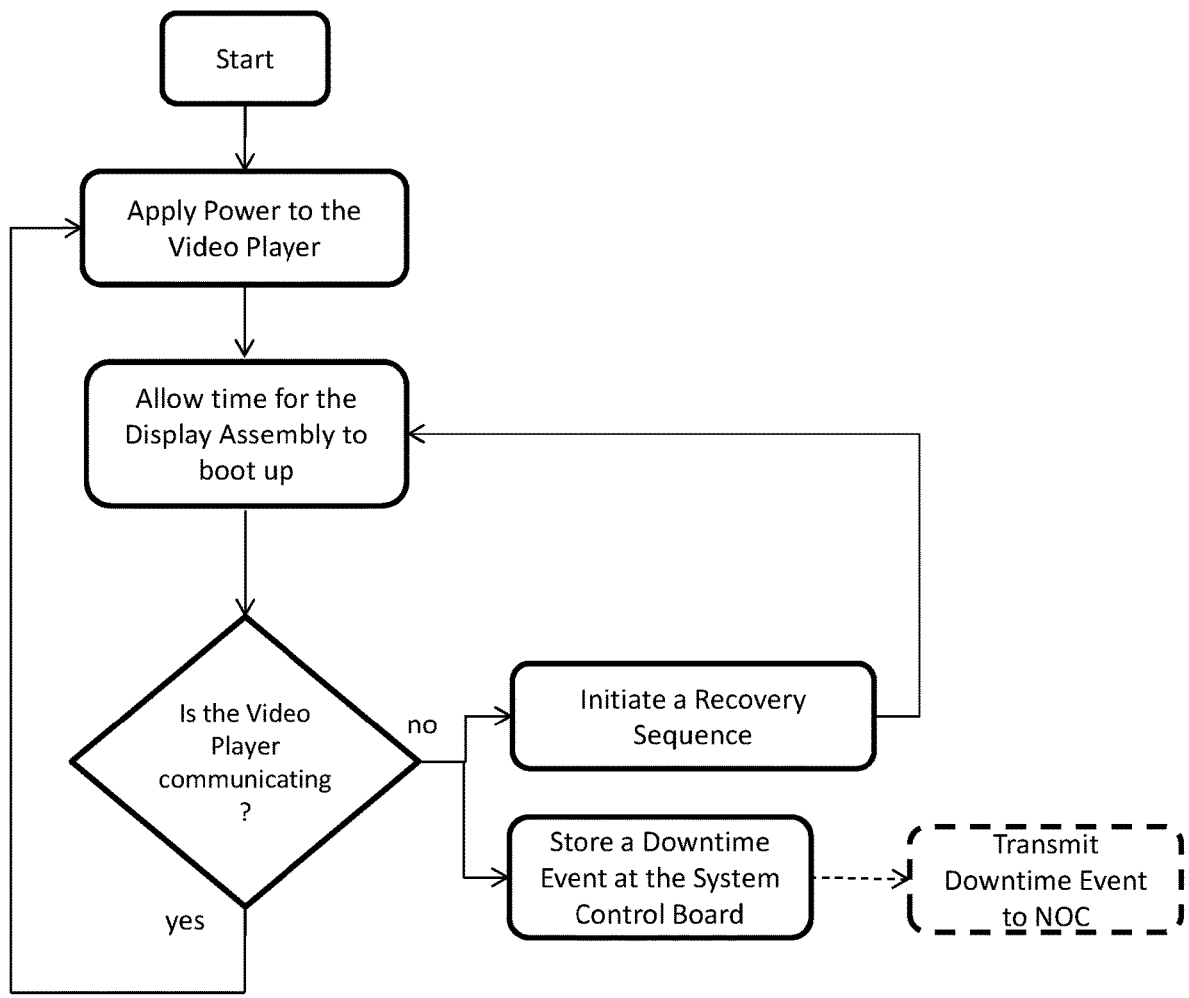
FIG. 2 is a logical flowchart for operating a first embodiment of the system.

FIG. 2 is a logical flowchart for operating a first embodiment of the system. In this embodiment, the system begins by applying power to the video player 103a. The system may next allow time for the display assembly to boot up, such as but not limited to, by use of a timer or counter.

In this embodiment, the system may then monitor the video player 103a to see if it is communicating, thus indicating normal operation. The system may monitor the video player 103a by checking for a heartbeat signal, which is periodically generated by the video player 103a to indicate normal operation or to synchronize other parts of the system. Alternatively, the system may monitor the signal from the power LED 105 to see if it is active. As another alternative, the system may transmit a ping to see if the video player 103a responds. In still further alternate embodiments, the system may check for status messages that may be periodically sent from the player 103a to the control board 101. If the video player 103a is communicating though any of the aforementioned or other means, the system may continue to apply power to the video player 103a.

If the video player 103a is not communicating, the system may do one of two things. First, the system may initiate a recovery sequence as described in greater detail in FIG. 9. Second, the system may store a downtime event or failure data at the system control board 101 and optionally transmit the downtime event or failure data to the NOC device 200. In some embodiments, the system may perform both functions when no communication is detected from the player 103a.

Regardless, if the video player 103 is communicating, the system may return to the beginning of the logic and simply apply power to the video player 103a while continuing to monitor the signal from the power LED 105a.

Figure 3:
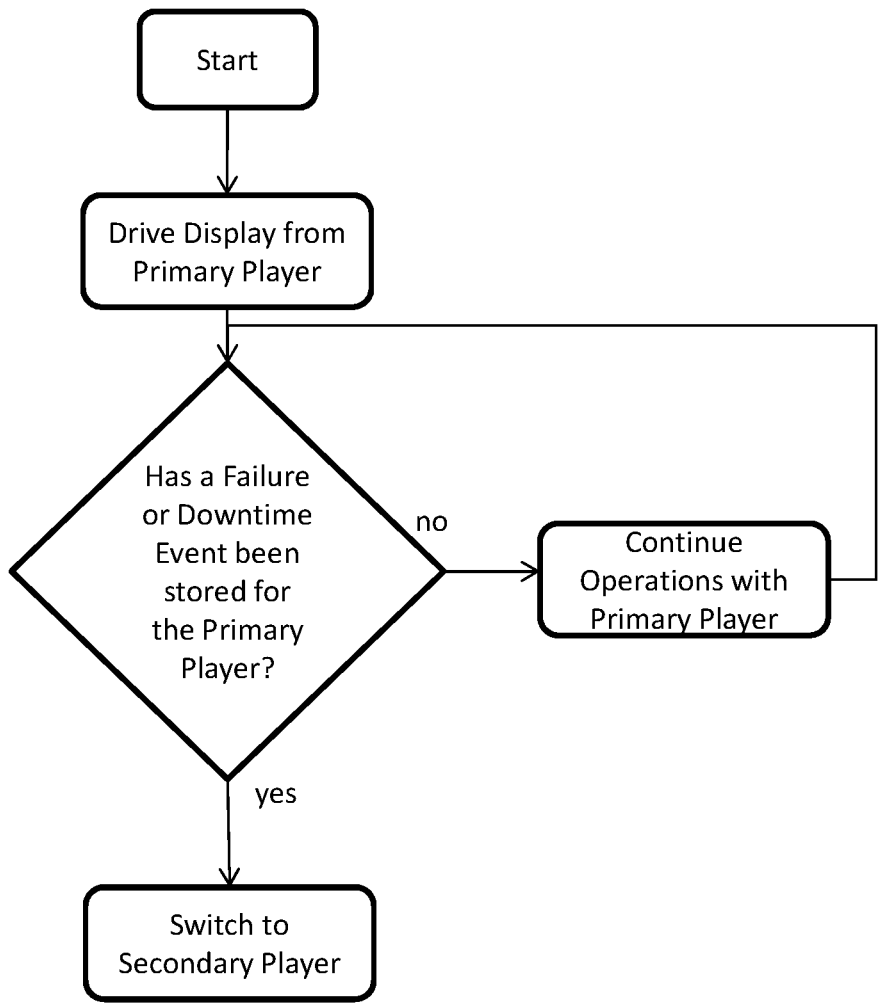
FIG. 3 is a logical flowchart for operating a second embodiment of the system.

FIG. 3 is a logical flowchart for operating a second embodiment of the system. Here the system begins by driving the display 30 from the primary player 103a. The system would then check to determine if any failure data or downtime event had been stored for the primary player 103a and if not, the system continues the normal operations with the primary player 103a. If any failure data or downtime event had been stored for the primary player 103a, the system may then switch to drive the display 30 from the secondary player 103b. For example, but not to serve as a limitation, a failure or downtime event may include no video being shown on the display 30, an unsupported resolution format being received, an unsupported frame rate being received, an error message being received, or the like.

Those having an ordinary level of skill in the arts will recognize that any threshold of amount, frequency, or type of failure data or downtime events may be set such that the system will not switch between the primary player 103a and the secondary player 103b until the threshold has been met or exceeded.

Figure 4:
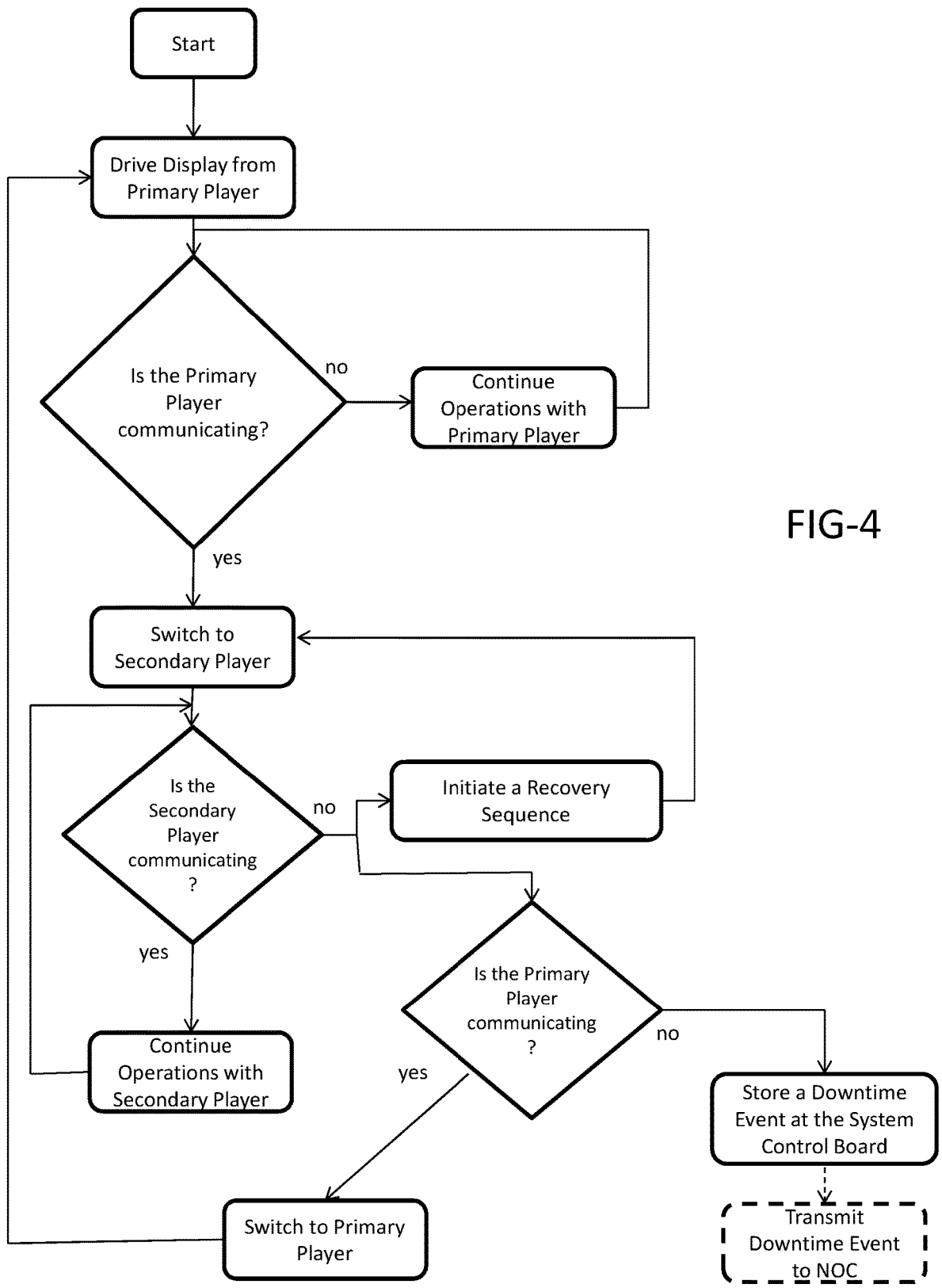
FIG. 4 is a logical flowchart for operating a third embodiment of the system.

FIG. 4 is a logical flowchart for operating a third embodiment of the system. In this embodiment, the system begins with logic similar to that shown and described above with respect to FIG. 3.

Under normal operating conditions, the system may drive the display 30 from the first video player 103a. However, once the system switches to the secondary player 103b, the system would preferably check to determine if the second video player 103b is communicating. If so, the system may continue normal operations with the second video player 103b. If not, the system may then do one of two things. First, the system may initiate a recovery sequence on the second video player 103b as previously discussed. Second, or in addition, the system may check to see if the first video player 103a is communicating. Preferably, the system first initiates the recovery sequence and only checks to see if the primary players is communicating after finding that the recovery sequence in unsuccessful. If the first video player 103a is communicating, the system may switch back to the first video player 103a. If not, the system may store a downtime event or failure data at the system control board 101 and optionally transmit the downtime event or failure data to the NOC device 200. In some embodiments, the system may perform both functions when the first video player 103a is not communicating. Further, if both the first and second video players 103a and 103b are not communicating, the system may direct the display assembly 200d to remain in a failure or downtime event condition. For example, but without limitation, the failure or downtime event condition may display a default or error message.

Figure 5:
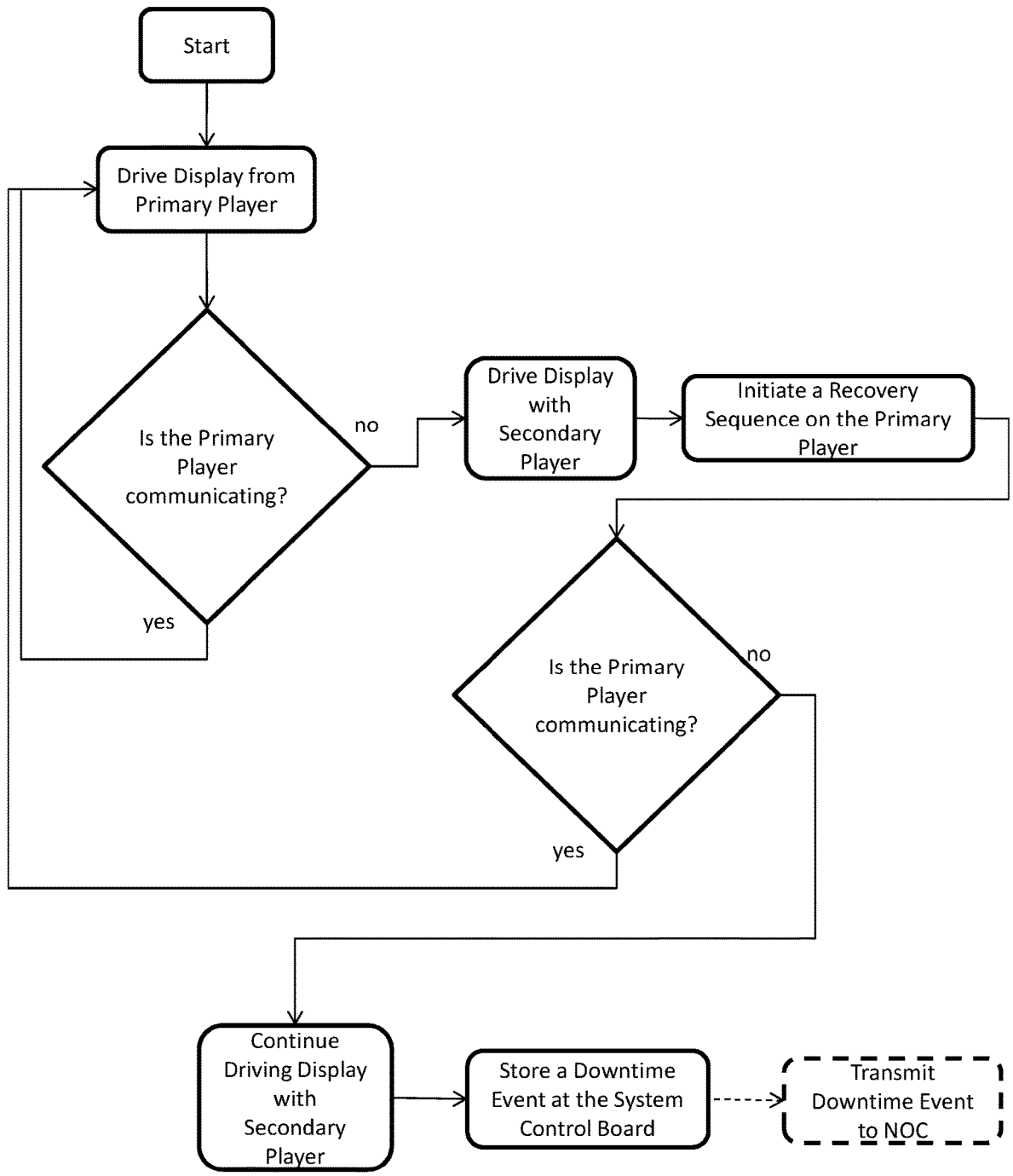
FIG. 5 is a logical flowchart for operating a fourth embodiment of the system.

FIG. 5 is a logical flowchart for operating a fourth embodiment of the system. Here the system begins by driving the display 30 from the primary player 103a. The system would then check to determine if the primary player 103a is communicating. If so, the system continues normal operations with the primary player 103a. If not, the secondary player 103b would then be used to drive the display 30 and the system may force a power off of the primary player 103a and then initiate a recovery sequence on the primary player 103a. The system would then return to check if the primary player 103a is communicating. If so, the system resumes operations from the primary player 103a, using it to drive the display 30. If not, the system continues operations with the secondary player 103b and may store a downtime event or failure data at the system control board 101 and optionally may transmit the downtime event or failure data to the NOC device 200.

Figure 6:
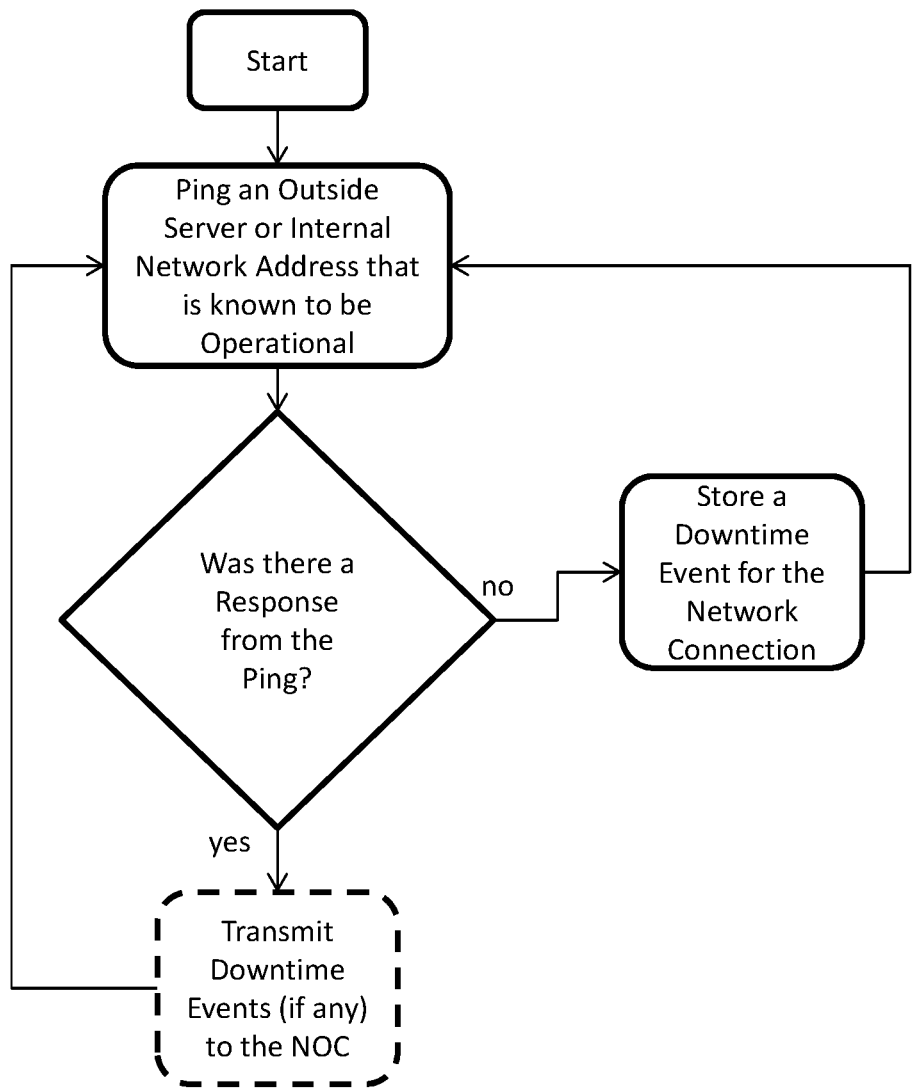
FIG. 6 is a logical flowchart for operating a fifth embodiment of the system.

FIG. 6 is a logical flowchart for operating a fifth embodiment of the system. In this embodiment, the system begins by pinging an outside server or internal network address that is known (or assumed) to be operational. If there is no response from the ping, a downtime event is stored for the network connection, indicating some type of failure within the network and/or the network interface component 70. The system may then return to ping an outside server or internal network address that is known (or assumed) to be operational. If there is again no response, then a downtime event is again stored for the network connection. Once the system receives a response for the ping, it may optionally transmit one or all of the downtime events to the NOC device 200.

Figure 7:
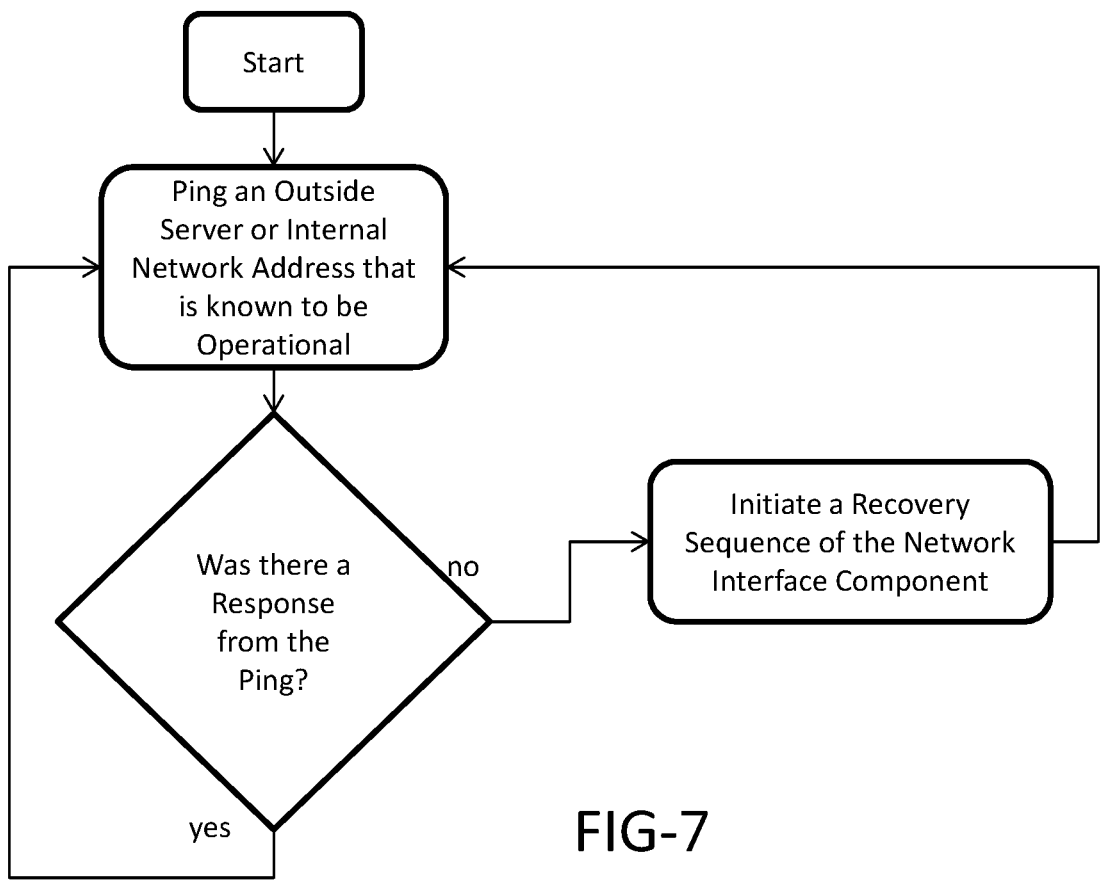
FIG. 7 is a logical flowchart for operating a sixth embodiment of the system.

FIG. 7 is a logical flowchart for operating a sixth embodiment of the system. In this embodiment, the system begins by pinging an outside server or internal network address that is known (or assumed) to be operational. If there is a response to the ping, the system may return to re-ping an outside server or internal network address again in the future to confirm that the network is operating correctly. If there is no response from the ping, the system may initiate a recovery sequence of the network interface component 70. The system would preferably return again to re-ping an outside server or internal network address again in the future to confirm that the network is operating correctly.

Figure 8:
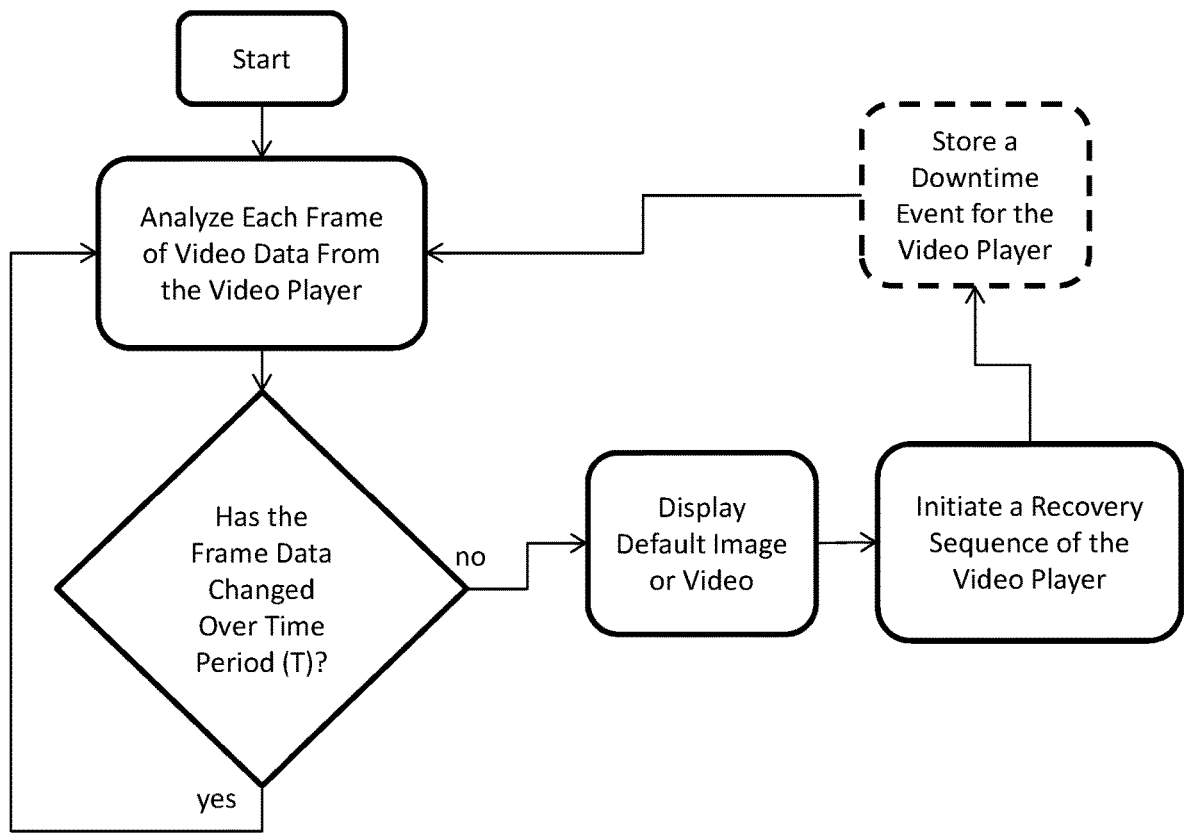
FIG. 8 is a logical flowchart for operating a seventh embodiment of the system.

FIG. 8 is a logical flowchart for operating a seventh embodiment of the system. In this embodiment, the system control board 101 may analyze each frame of video/image data from the video player 103a to determine if the frame data has changed over a period of time (T), which can be any period of time chosen by the user, where an exemplary period of time (T) may be on the order of 10-15 minutes, but again could be any period of time. If the frame data has changed, the system would return to have the control board 101 analyze more frames of video/image data. If the frame data has not changed over T, then a default image or video may be displayed while the system initiates a recovery sequence on the video player 103a. Optionally, the system may store a downtime event or failure data for the video player 103a at the system board 101. After running the recovery sequence on the video player 103a, the system may return to normal operations so that the control board 101 may analyze more frames of video/image data to confirm that either the video player 103a is now operating properly, continues to operate properly, or continues to have downtime or a failure.

Figure 9:
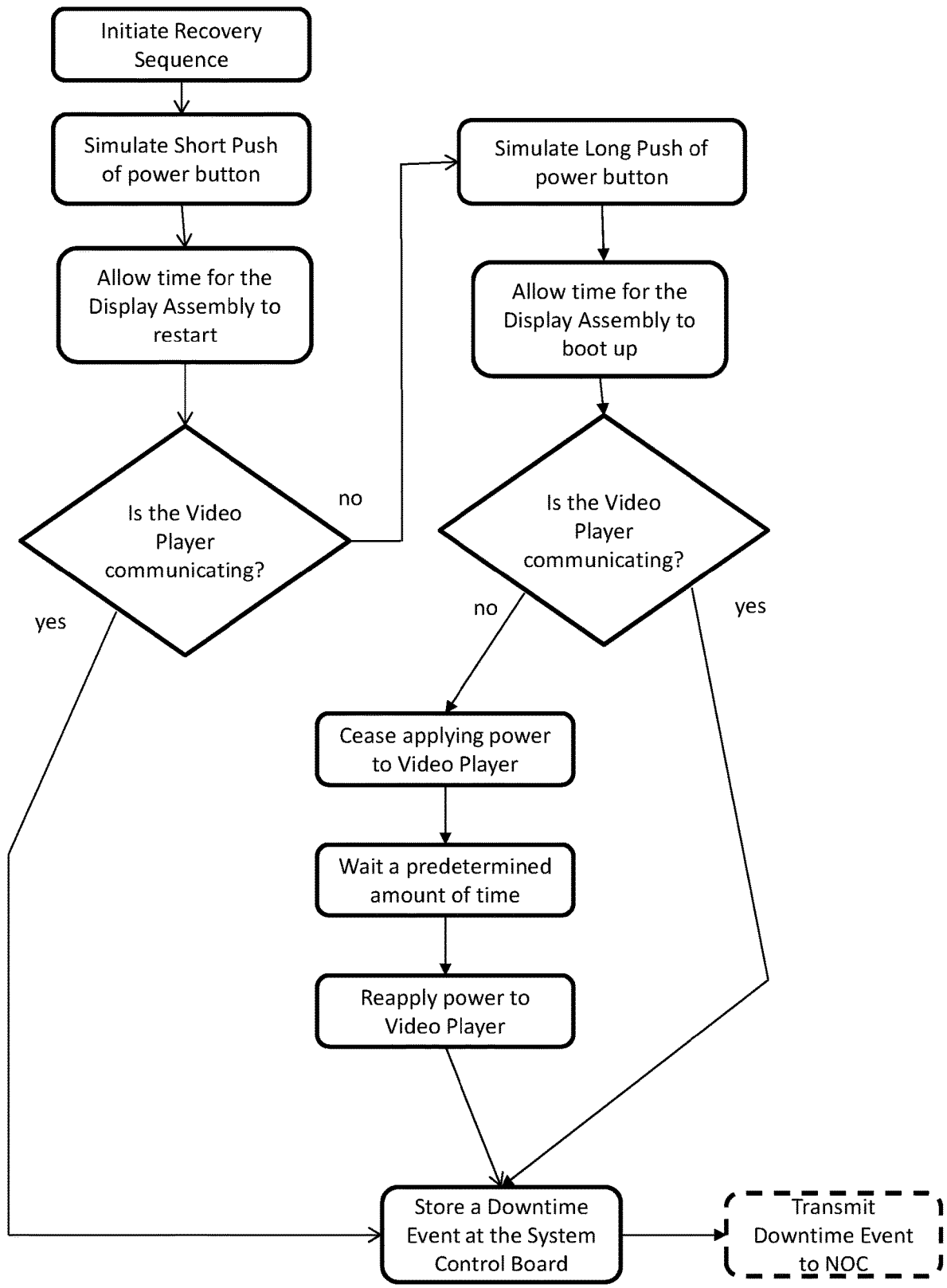
FIG. 9 is a logical flowchart for operating an eighth embodiment of the system.

FIG. 9 is a logical flowchart for operating an eighth embodiment of the system. Specifically, FIG. 9 describes an exemplary embodiment of the recovery sequence. The recovery sequence may include a simulation of the user depressing the power button 104a and/or attaching and reattaching the power supply (i.e., unplugging and re-plugging in the display assembly 200 or individual components thereof). The recovery sequence may comprise a simulated "short push" of the power button 104a, a "long push" of the power button 104a, and/or ceasing to supply power to the video player 103a and then reapplying power after a period of time has elapsed. The short push may simply command the video player 103a to restart. The long push may force the video player 103a to restart. Alternatively, or in addition, the recovery sequence may cut power to the video player 103 and then reapply power after a period of time has elapsed.

In exemplary embodiments of the present invention, the system may first simulate a short push of the power button 104a for the video player 103a and allow time for it to restart. The system may then check to see if the video player 103a is communicating. If so, the system may store a downtime event and optionally may transmit the downtime event to the network operations center 200. If not, the system may simulate a long push of the power button 104a and allow time for the video player 103a to reboot. The system may then check to see if the video player 103a is communicating. If so, the system may store a downtime event and optionally may transmit the downtime event to the network operations center 200. If not, the system may cease applying power to the video player 103a, wait a predetermined amount of time, and reapply power to the video player.

Optionally, the system may then check to see if the video player 103a is communicating. If so, the system may store a downtime event and optionally may transmit the downtime event to the network operations center 200. If not, the system may store a failure, optionally place the display assembly 200d in a default or failure mode, and optionally may transmit the failure to the network operations center 200.

While the recovery sequence is discussed with respect to the video player 103a and the respective power button 104a, it may be utilized with the second video player 103b and the respective power button 104b, the power button 75, as well as with other components of the system.

As used herein, a downtime event and/or failure is a data package representing any number of pieces of data including but not limited to the date and time for when the particular portion of the system went down, specifically which component of the system went down, how long the component was down, and the date and time for when operations resumed.

In exemplary embodiments of the present invention, and as discussed herein, the first video player 103a may be designated as the primary player, and the second video player 103b may be designated as the secondary player, though the reverse is contemplated.

The electronic display 30 can be any flat panel electronic display including but not limited to: liquid crystal displays (LCD), organic light emitting diode (OLED) displays, plasma displays, electroluminescent polymer displays, and the like.

Those having an ordinary level of skill in the arts will recognize that the buttons described herein, such as but not limited to the power button 75 and the power button 104, may be physical buttons or may be non-physical buttons such as an electrical signal, switch, circuit, transistor, or the like.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for remotely addressing operational failures, said system comprising:
a plurality of electronic display assembles, each comprising an electronic display, one or more components for operating the respective electronic display assembly, a system control board in electronic communication with a network and electrically connected to the one or more components for operating the respective electronic display assembly; and
a network operations center in electronic communication with each of the plurality of electronic display assembles, wherein the network operations center is located remote from the plurality of electronic display assemblies;
wherein each of the system control boards are configured to determine if the one or more components of the respective electronic display assembly are not operating properly and generate a signal for transmission to the network operations center indicating the improper operation of the one or more components;
wherein each of the system control boards are configured to simulate a short push of a power button by sending the one or more components of the respective electronic display assembly instructions to restart;
wherein each of the system control boards are electrically connected to a power supply for said one or more components of the respective electronic display assembly and are configured to remove the power supplied to the one or more components of the respective electronic display assembly, wait a predetermined amount of time, and resume applying power to the one or more components of the respective electronic display assembly.

2. The system of claim 1 wherein:
each of the system control boards are further configured to simulate along push of the power button by sending the one or more components of the respective electronic display assembly force restart instructions.

3. The system of claim 2 wherein:
each of the system control boards are configured to receive instructions to initiate a recovery sequence; and
upon receipt of instructions to initiate the recovery sequence, the respective control device is configured to, for the respective one or more components, first simulate a short push of the power button, simulate along push of the power button if nonoperation is determined after simulating a short push of the power button, and then remove the power supply, wait a predetermined amount of time, and resume applying power if nonoperation is determined after simulating along push of the power button.

4. The system of claim 1 wherein:
the one or more components comprise a video player.

5. The system of claim 1 wherein:
each of the system control boards are configured to periodically generate and transmit signals to the network operations center regarding operational status of the one or more components.

6. The system of claim 5 wherein:
each of the system control boards are configured to generate and store a downtime event if any of the one or more components of the respective electronic display assembly are determined to be nonoperational; and
each of the system control boards are configured to transmit downtime events to the network operations center.

7. The system of claim 1 wherein:
each of the system control boards are configured to determine that the one or more components are improperly operating where said one or more components are not communicating.

8. The system of claim 1 wherein:
each of the electronic display assemblies comprises a first video player and a second video player;
the system control board for each electronic display assembly is configured to designate one of the first and second video players as primary and the other one of the first and second video player as secondary;
the system control board for each of the electronic display assemblies is configured to provide content to the respective electronic display using the primary designated one of the first and second video players; and
the system control board for each of the electronic display assemblies is configured to switch to the secondary designated one of the first and second video players if the primary designated one of the first and second video players is not communicating.

9. The system of claim 8 wherein:
the system control board for each of the electronic display assemblies is configured to switch to the secondary designated one of the first and second video players for the respective electronic display assembly only if the primary designated one of the first and second video players for the respective electronic display assembly is not operating after removing power supplied to the primary designated one of the first and second video players, waiting a predetermined amount of time, and resuming the application of power to the primary designated one of the first and second video players.

10. The system of claim 8 wherein:
the system is configured to switch back to the primary designated one of the first and second video players if the secondary designated one of the first and second video players is not operating and the primary designated one of the first and second video players is operating.

11. The system of claim 1 wherein:
each of said electronic display assemblies comprise a network interface component configured to facilitate electronic communication over said network between said system control board of the respective electronic display assembly and said network operations center.

12. The system of claim 1 wherein:
at least one of said one or more components for each of said electronic display assemblies comprise a timing and control board in electronic communication with said system control board and said electronic display of said respective electronic display assembly.

13. The system of claim 1 wherein:
each of said electronic display assemblies comprise a second electronic display in electronic communication with said system control board.

14. A method for remotely addressing operational failures, said method comprising the steps of:
providing a plurality of electronic display assembles, each comprising an electronic display, one or more components for operating the electronic display assembly, and a system control board electrically connected with the one or more components for operating the electronic display assembly and in electronic communication with a network;

placing a network operations center in electronic communication with each of the plurality of electronic display assembles by way of the network, wherein the network operations center is located remote from the plurality of electronic display assemblies;

monitoring each of the electronic display assemblies, by way of the control devices, to identify one of the electronic display assemblies not operating properly;

generating, at the system control board for the improperly operating one of the electronic display assemblies, a signal for transmission to the network operations center identifying the improperly operating one of the electronic display assemblies;

instructing the improperly operating one of the electronic display assemblies to simulate a short push of the power button by sending the system control board for the improperly operating one of the electronic display assemblies instructions to initiate a recovery sequence; and removing, by way of the system control board for the improperly operating one of the electronic display assemblies, the power supplied to the one or more components of the improperly operating one of the electronic display assemblies, waiting a predetermined amount of time, and resupplying the power supply to the one or more components of the improperly operating one of the electronic display assemblies.

15. The method of claim 14 further comprising the steps of:
notifying the network operations center of a downtime event upon determination that the improperly operating one of the electronic display assemblies is not operating properly.

16. The method of claim 14 further comprising the steps of:
instructing the improperly operating one of the electronic display assemblies to simulate along push of the power button by sending the system control board of the improperly operating one of the electronic display assemblies force restart instructions.

17. The method of claim 14 further comprising the steps of:
providing, at each of the electronic display assemblies, a primary video player and a secondary video player; and
instructing, by way of the system control boards, each respective one of the electronic display assemblies to operate with the secondary video player of the respective one of the electronic display assemblies upon determination that the primary video player of the respective one of the electronic display assemblies is not operating properly.

18. The system of claim 14 wherein:
each of said electronic display assemblies comprise a network interface component configured to facilitate electronic communication over said network between said system control board of the respective electronic display assembly and said network operations center; and each of said electronic display assemblies comprise a timing and control board in electronic communication with said system control board and said electronic display of said respective electronic display assembly.

19. A system for remotely addressing operational failures, said system comprising:
a plurality of electronic display assembles, each comprising an electronic display, a system control board, one or more components for operating the respective electronic display assembly in electrical connection with system control board, wherein the system control board is in electronic communication with a network and is electrically connected to each of the one or more components; and a network operations center in electronic communication with each of the plurality of electronic display assembles, wherein the network operations center is located remote from the plurality of electronic display assemblies;

wherein each of the system control boards are configured to determine if the one or more components of the respective electronic display assembly are not operating properly and generate a signal for transmission on said network indicating the improper operation of the one or more components to the network operations center;

wherein each of the system control boards are configured to receive instructions to initiate a recovery sequence from the network operations center;

wherein each of the system control boards are electrically connected to a power supply for said one or more components of the respective electronic display assembly;

wherein each of the system control boards are configured to, following receipt of instructions to initiate said recovery sequence, simulate a short push of a power button of the respective electronic display assembly, and if said one or more components are still not operating properly, subsequently simulate a long push of the power button, and if said one or more components are still not operatinq properly, subsequently cease supplying power from the power supply for the one or more components of the respective electronic display assembly, wait a predetermined amount of time, and resume applying power from the power supply to the one or more components of the respective electronic display assembly.

20. The system of claim 19 wherein:
the network operations center comprises a personal electronic device.

\* \* \* \* \*